United States Patent
Cai et al.

(10) Patent No.: US 8,407,432 B2
(45) Date of Patent: Mar. 26, 2013

(54) CACHE COHERENCY SEQUENCING IMPLEMENTATION AND ADAPTIVE LLC ACCESS PRIORITY CONTROL FOR CMP

(75) Inventors: Zhong-Ning Cai, Lake Oswego, OR (US); Krishnakanth V. Sistla, Hillsboro, OR (US); Yen-Cheng Liu, Portland, OR (US); Jeffrey D. Gilbert, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 114 days.

(21) Appl. No.: 11/173,917

(22) Filed: Jun. 30, 2005

(65) Prior Publication Data

US 2007/0005909 A1    Jan. 4, 2007

(51) Int. Cl.
*G06F 12/00* (2006.01)
(52) U.S. Cl. .............................. 711/157; 711/E12.079
(58) Field of Classification Search .................... 711/157
See application file for complete search history.

(56) References Cited

U.S. PATENT DOCUMENTS

| | | | | |
|---|---|---|---|---|
| 4,783,736 A | * | 11/1988 | Ziegler et al. | 711/130 |
| 4,870,704 A | * | 9/1989 | Matelan et al. | 710/120 |
| 5,555,404 A | * | 9/1996 | Torbjørnsen et al. | 707/202 |
| 5,699,460 A | * | 12/1997 | Kopet et al. | 382/307 |
| 5,935,230 A | * | 8/1999 | Pinai et al. | 710/111 |
| 5,960,463 A | * | 9/1999 | Sharma et al. | 711/206 |
| 6,101,589 A | * | 8/2000 | Fuhrmann et al. | 711/169 |
| 6,161,208 A | * | 12/2000 | Dutton et al. | 714/764 |
| 6,249,851 B1 | * | 6/2001 | Richardson et al. | 711/167 |
| 6,438,635 B1 | * | 8/2002 | Date et al. | 710/113 |
| 6,499,076 B2 | * | 12/2002 | Date et al. | 710/113 |
| 6,631,451 B2 | * | 10/2003 | Glance et al. | 711/158 |
| 6,754,781 B2 | * | 6/2004 | Chauvel et al. | 711/143 |
| 6,754,782 B2 | * | 6/2004 | Arimilli et al. | 711/144 |
| 2003/0056062 A1 | * | 3/2003 | Prabhu | 711/143 |
| 2004/0117554 A1 | * | 6/2004 | Raghavan | 711/118 |
| 2005/0210321 A1 | * | 9/2005 | Bai et al. | 714/13 |

OTHER PUBLICATIONS

IBM Technical Disclosure Bulletin; Second-Level Shared Cache Implementation for Multiprocessor Computers With a Common Interface for The Second-Level Shared Cache and The Second-Level Private Cache; Apr. 1, 1991; vol. 33; Issue 11; pp. 1-5.*
Jim Handy, "The Cache Memory Book: The Authoritative Reference on Cache Design", 1998, pp. 156-158.*
Unknown, (Process Scheduling), Jan. 18, 2004, pp. 1-2, http://replay.waybackmachine.org/20040118054804/http://homepages.uel.ac.uk/u0222323/scheduling.htm.*

* cited by examiner

*Primary Examiner* — Edward Dudek, Jr.
*Assistant Examiner* — Christopher Birkhimer
(74) *Attorney, Agent, or Firm* — Mnemoglyphics, LLC; Lawrence M. Mennemeier

(57) ABSTRACT

A method and apparatus for cache coherency sequencing implementation and an adaptive LLC access priority control is disclosed. One embodiment provides mechanisms to resolve last level cache access priority among multiple internal CMP cores, internal snoops and external snoops. Another embodiment provides mechanisms for implementing cache coherency in multi-core CMP system.

20 Claims, 6 Drawing Sheets

CACHE COHERENCY SEQUENCING IMPLEMENTATION AND ADAPTIVE LLC ACCESS PRIORITY CONTROL FOR CMP

BACKGROUND INFORMATION

Multi-core processors contain multiple processor cores which are connected to an on-die shared cache though a shared cache scheduler and coherence controller. Multi-core multi-processor systems are becoming increasingly popular in commercial server systems because of their improved scalability and modular design. The coherence controller and the shared cache may either be centralized or distributed among the cores depending on the number of cores in the processor design. The shared cache is usually designed as an inclusive cache to provide good snoop filtering.

The internal cores are interconnected by high speed internal buses and the external system bus may be shared among those internal cores and other CMP (chip multiprocessor) resources. To reduce the silicon size and improve the potential performance, the LLC (last level cache) is normally shared by multiple internal cores. However, the CMP system bus and memory controller behavior may not be predictable. They may have burst requests to LLC, such as the external snoop requests. A fixed last level cache access priority could be a benefit for one class of applications and degrade the other class of applications. Thus, a need exists for an architecture that may adaptively adjust the priority and is sensitive to latency.

BRIEF DESCRIPTION OF THE DRAWINGS

Various features of the invention will be apparent from the following description of preferred embodiments as illustrated in the accompanying drawings, in which like reference numerals generally refer to the same parts throughout the drawings. The drawings are not necessarily to scale, the emphasis instead being placed upon illustrating the principles of the inventions.

DETAILED DESCRIPTION

The following description describes techniques for improved cache coherency implementation and adaptive LLC access priority control for CMPs. In the following description, numerous specific details such as logic implementations, software module allocation, bus and other interface signaling techniques, and details of operation are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments.

In certain embodiments the invention is disclosed in the form caching bridges present in implementations of multi-core Pentium® compatible processor such as those produced by Intel® Corporation. However, the invention may be practiced in the cache-coherency schemes present in other kinds of multi-core processors, such as an Itanium® Processor Family compatible processor or an X-Scale® family compatible processor.

Figure 1A:
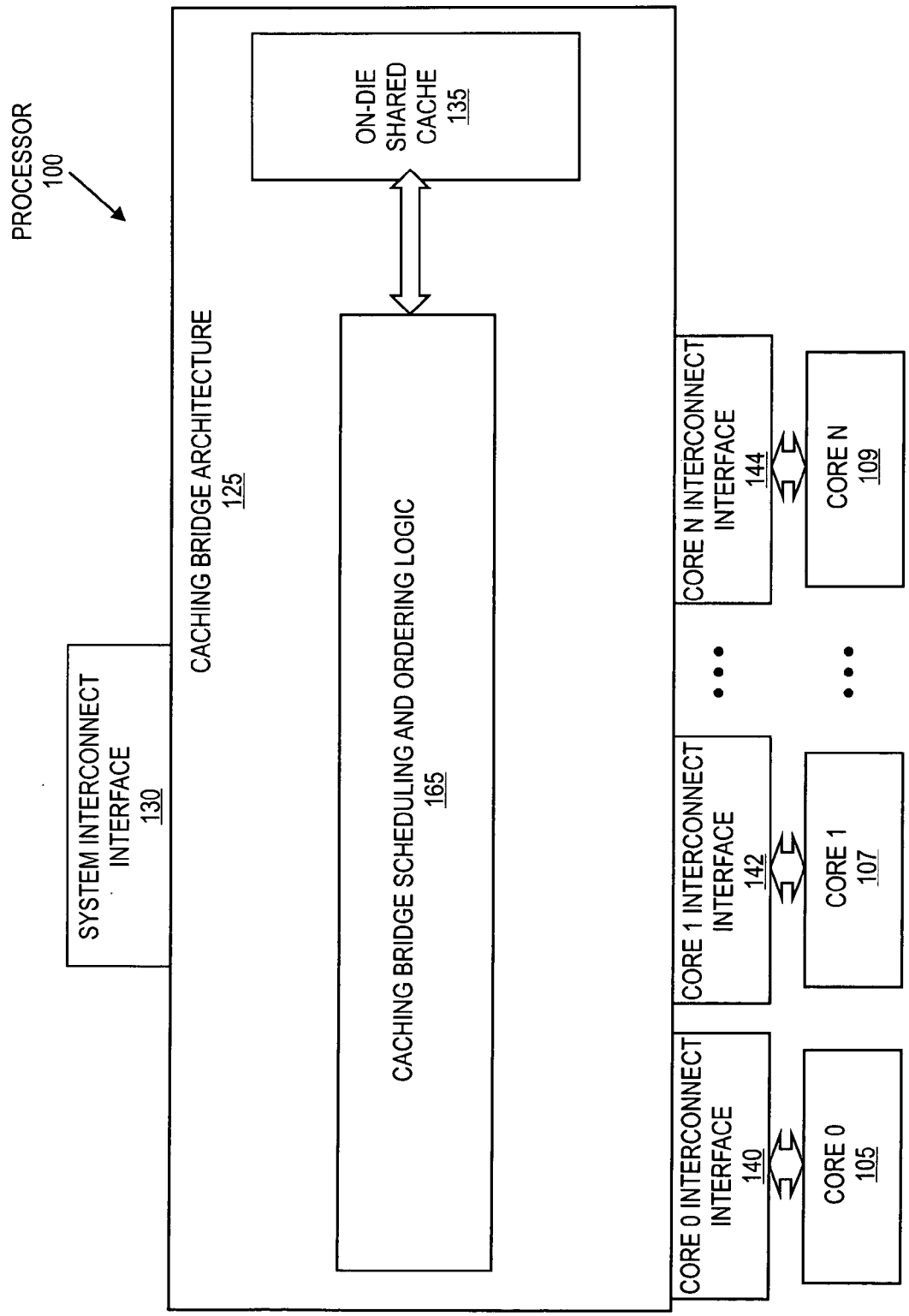
FIG. 1a is a block diagram of a MCMP (Multi-CMP) system with a caching bridge, according to one embodiment.

Referring now to FIG. 1a, a block diagram of a processor 100 including a bridge and multiple cores is shown, according to one embodiment. Processor 100 may have N processor cores, with core 0, 105, core 1, 107, and core N 109 shown. Here N may be any number. Each core may be connected to a bridge as shown using interconnections, with core 0 interconnect interface 140, core 1 interconnect interface 142, and core N interconnect interface 144 shown. In one embodiment, each core interconnect interface may be a standard front-side bus (FSB) with only two agents, the bridge and the respective core, implemented. In other embodiments, other forms of interconnect interface could be used such as dedicated point-to-point interfaces.

Caching bridge 125 may connect with the processor cores as discussed above, but may also connect with system components external to processor 100 via a system interconnect interface 130. In one embodiment the system interconnect interface 130 may be a FSB. However, in other embodiments the system interconnect interface 130 may be a dedicated point-to-point interface.

Processor 100 may in one embodiment include an on-die shared cache 135. This cache may be a last-level cache (LLC), which is named for the situation in which the LLC is the cache in processor 100 that is closest to system memory (not shown) accessed via system interconnect interface 130. In other embodiments, the cache shown attached to a bridge may be of another order in a cache-coherency scheme.

Scheduler 165 may be responsible for the cache-coherency of LLC 135. When one of the cores, such as core 0, 105, requests a particular cache line, it may issue a core request up to the scheduler 165 of bridge 125. The scheduler 165 may then issue a cross-snoop when needed to one or more of the other cores, such as core 1, 107. In some embodiments the cross-snoops may have to be issued to all other cores. In some embodiments, they may implement portions of a directory-based coherency scheme (e.g. core bits). The scheduler 165 may know which of the cores have a particular cache line in their caches. In these cases, the scheduler 165 may need only send a cross-snoop to the indicated core or cores.

Figure 1B:
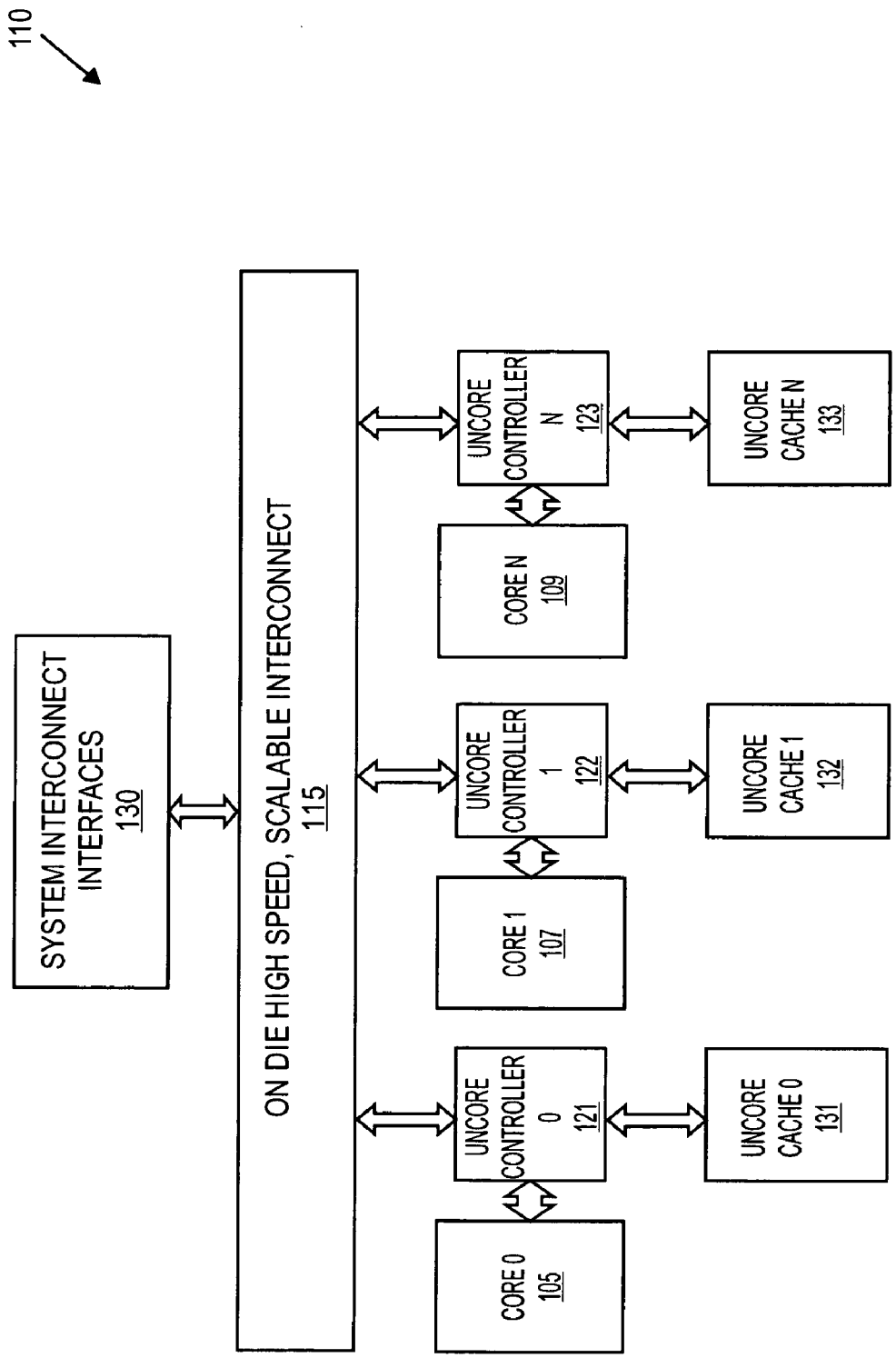
FIG. 1b is a block diagram of a distributed shared cache, according to one embodiment.

Referring now to FIG. 1b, a diagram of a processor with a distributed shared cache, according to one embodiment. In this processor 110, the shared cache and coherency control logic is distributed among the multiple cores. In particular, each core 105, 107, 109 is connected to the other uncore caches 131, 132, 133 through its uncore controllers 121, 122, 123. The cache is broken up into N components, but logically behaves as one single cache. Each core may access the other caches through the uncore controller and interconnect. It is immaterial how the cache is designed, as long as, there are multiple cores and the cache is an inclusive, unified shared cache. By uncore, it means everything beyond the core interface. The eviction method described herein occurs in the uncore controller.

The scalable high speed on-die interconnect 115 may ensure that the distributed shared cache accesses have a low latency. There exists a latency and scalability tradeoff between both the configurations of FIGS. 1a and 1b. The caching bridge architecture of FIG. 1a may provide a low latency access to the shared cache when the number of cores is relatively small (2 to 4). As the number of cores increases, the bridge 165 may become a performance bottleneck. The distributed shared configuration of FIG. 1b may provide a scalable but relatively higher latency access to the shared cache 135.

Multi processor systems may slow down the core pipelines by the large amount of snoop traffic on the system interconnect. The CMP shared cache may be designed as fully inclusive to provide efficient snoop filtering. To maintain the inclusive property the bridge logic needs to ensure that whenever a line is evicted from the shared cache back snoop transactions are sent to the cores to remove the line from the core caches. Similarly all lines filled into the core caches are filled in to the LLC. The uncore control logic may sequence these back snoop transactions to all the core caches which contain the corresponding cache line. Eviction processing for lines which are shared between multiple cores may be made efficient by using the presence vector information stored in the inclusive shared cache.

The LLC is the largest on die memory hierarchy and normally shared by multiple cores on die. Many coherency protocol functions, such as coherency states and core bits, often are implemented in the LLC. Therefore, the LLC is a cross point for the CMP coherency protocol implementation. Generally, there are two critical LLC access requests from a CMP server system. First are the on die core LLC access requests and second are the snoop requests.

The on die cores need to access their shared LLC to get the requested data as soon as possible. Any delay will directly impact the core performance. The snoop requests may be either external snoops from other sockets in the system or a self-snoop from the same package or a cross snoop from one of the on die cores for data coherency.

In addition, there may be side impacts on other parts of the overall performance critical paths. For example, the intensive speculative prefetching and temporary high LLC miss rate could saturate the IO. The throughput-latency curve could go above the knee point so that the latency increases exponentially. This may degrade the overall performance even if the LLC cache access to be granted to those access with high priority. Similarly, any delay of the external snoop responses could have impact on either the other cores or the other socket performance. This is specifically important for a MP server because it has a multiple CMP on multiple sockets system. The fixed LLC access priority control may have difficulty on CMP LLC access control for optimization, when the LLC access bandwidth is limited.

The proposed implementation resolves the last level cache access priority among multiple internal CMP cores, internal snoops, and external snoops.

Figure 2:
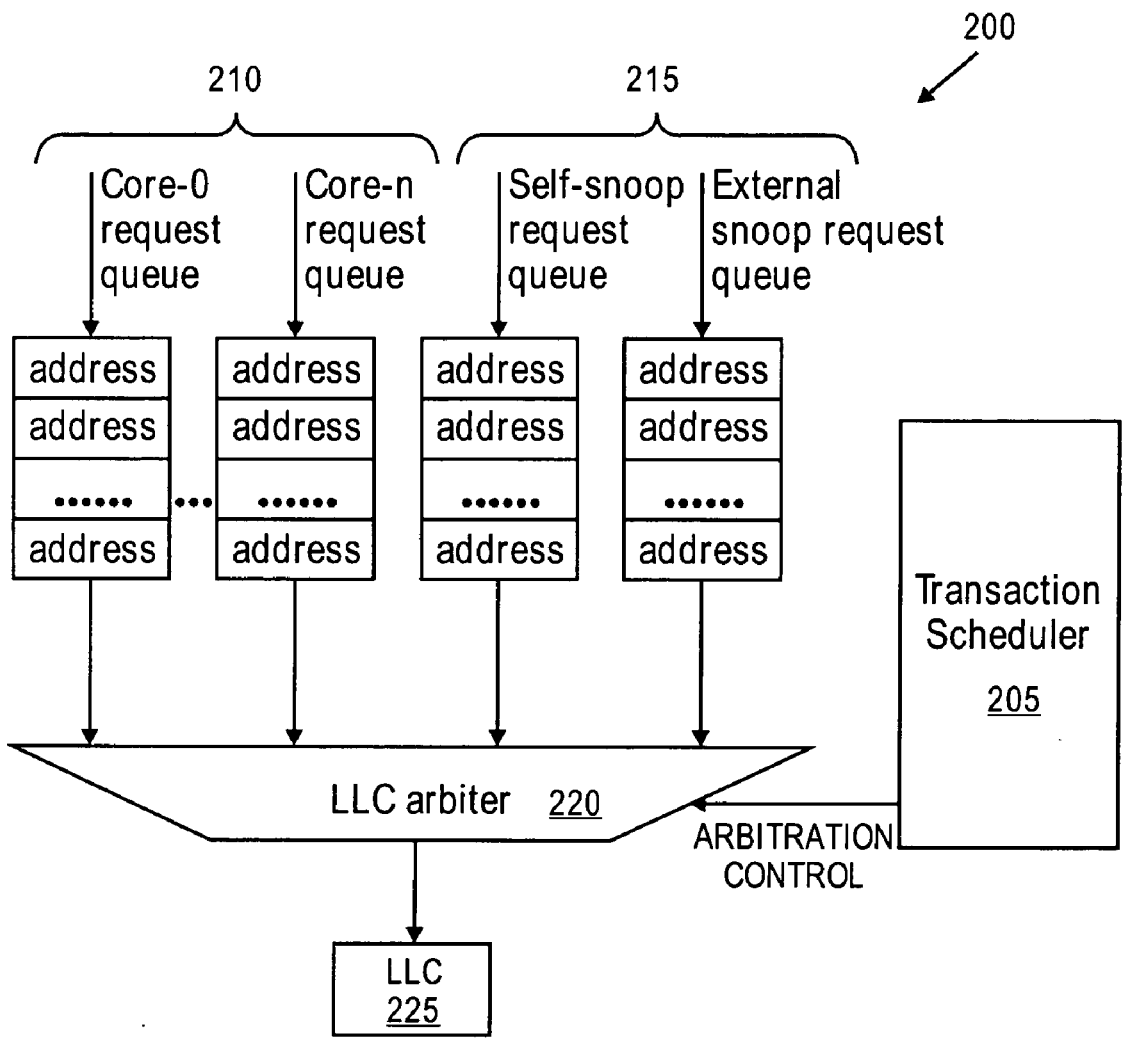
FIG. 2 is a block diagram of a LLC arbitration logic according to one embodiment.

Referring now to FIG. 2, illustrating a diagram of an LLC arbitration logic 200. The CMP cores may individually generate the shared LLC access request. A CMP uncore transaction scheduler 205 may oversee all requests from every internal cores 210. The scheduler 205 may then know request transaction type, request queue occupancy, and other information. Based on the LLC access utilization and external bus utilization, the scheduler 205 adaptively uses appropriate priority mechanism to on die cores and snoop requests 215.

The multiple core 210 and snoop 215 requests may occur at the same time. The LLC access arbitration logic 220 must then schedule accordingly to avoid performance degradation. In order to avoid having multiple requests at the same time, the arbitration logic 220 needs to determine utilization of the LLC 225.

If the arbitration logic 220 determines that the LLC 225 has very low utilization, then the LLC arbitration logic 220 may schedule all LLC access requests 210, 215 in a round-robin fashion. In this instance, there is no potential starvation possibility and all requests are treated equally.

If the arbitration logic 220 determines that the LLC 225 has high utilization, then the LLC arbitration logic 220 may run a priority selection mechanism. With the priority selection mechanism, the logic 220 may grant the external snoop with highest priority. This will ensure that the other processors will not be forced to idle. When there are multiple snoop requests 215 (these snoops could come from multiple internal core self-snoop requests, cross snoop requests, or external snoop requests), the LLC priority selection logic may grant the external snoop request first, then cross snoop request, and then self-snoop request.

The runtime average LLC bandwidth and latency checking mechanism is through a LLC request queue occupancy calculation. For the average core LLC request queue occupancy, Qc, calculate:

$$Qc = \text{sum}\{(i=1, N)[\text{sum } j=1, E]\}/N.$$

For the average snoop LLC request queue occupancy, Qs, calculate:

$$Qs = \text{sum}\{(i=1, n)[\text{sum } (j=1, e)]\}/n.$$

For the above calculations, N is the number of core LLC request queues (logically) N={1, 2, 3, ..., 8}; E is the number of outstanding entries in a core request queue; n is the number of snoop LLC request queues (logically) n={1, 2, 3, 4}; e is the number of outstanding entries in a snoop request queue; t is the number of transaction scheduler clock cycles that the average LLC bandwidth and latency will be calculated and T is the threshold to switch the LLC scheduling mechanism.

If (Qc+Qs)/t<T, then round robin scheduling mechanism is implemented. Otherwise, if (Qc+Qs)/t>=T, then a priority based round robin arbitration mechanism is implemented. The priority based round robin arbitration may also include merging the redundant access request and anti-starvation mechanism check. It should also be noted that t is programmable and large enough to avoid the frequent ping-pong on the scheduling mechanism and T is the LLC bandwidth threshold constant. Default set may be 0.4 or 40% of LLC access utilization. Both variables should be programmable and may be tuned in system performance optimization.

With respect to anti-starvation mechanism, the priority selection mechanism guarantees that all requests may have minimal progress within a given time interval. If there are multiple outstanding LLC access requests, the priority selection logic may ensure that there is a minimal LLC access request progress to every requester within a given time interval.

With respect to reduction of multiple cycle blocking LLC accesses, if there are snoop and core LLC access request to be scheduled back-to-back accessing the same address, the second access is a read that may be re-directed to use the previous access result. By comparing from the transaction scheduler, the redundant access is eliminated. The comparison may reuse the conflict detection content-addressable memory (CAM) logic that may be used for CMP conflict detection and resolution.

Figure 3:
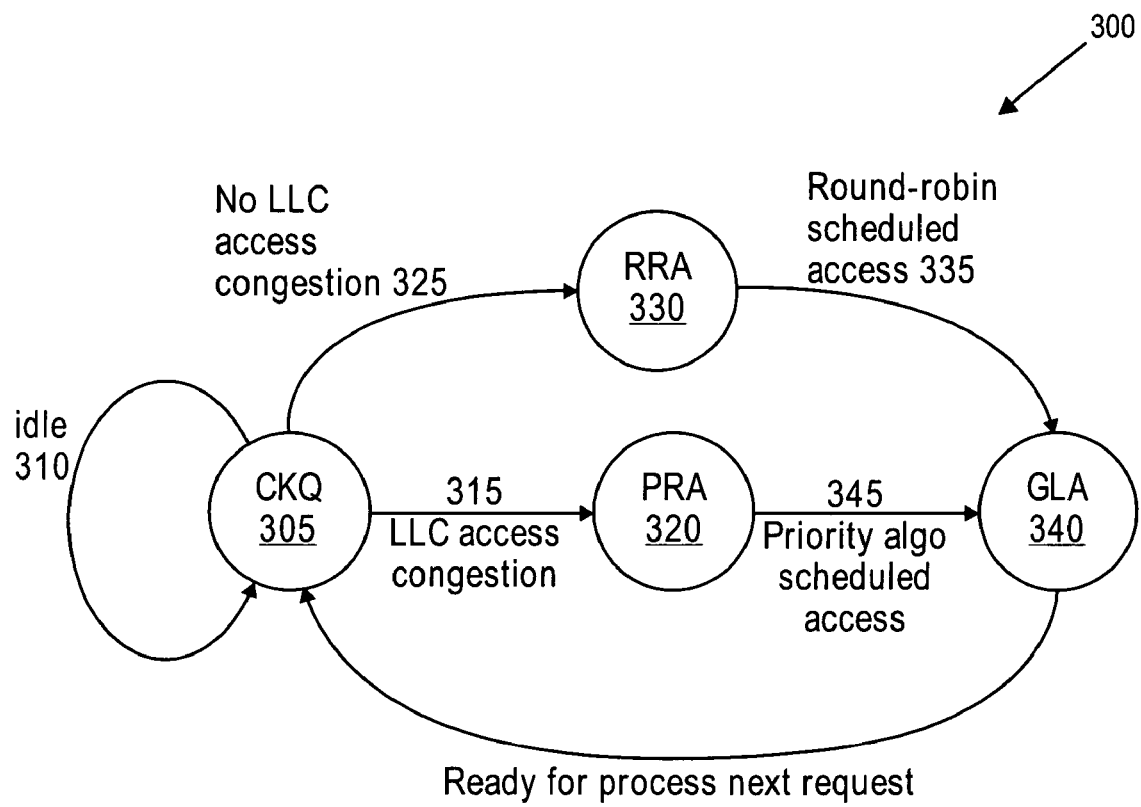
FIG. 3 is a logic state diagram of an adaptive LLC access priority control according to one embodiment.

FIG. 3 illustrates a state logic diagram for an adaptive LLC access priority control 300. Initially at state CKQ 305, the LLC access control and arbitration logic probes the outstanding LLC access requests from all internal on cores and all snoops. If there is no request, the arbitration logic stays idle 310. If there is a request, then the LLC access bandwidth and latency are checked. If either the LLC bandwidth or latency are over the normal utilization 315, the priority round robin arbitration (PRA) may be used 320. This may then prioritize the access without starvation and thus create a performance benefit for the overall optimization. If there is a request and the bandwidth or latency is not over normal utilization 325, then a round-robin arbitration (RRA) 330 may be used for scheduling.

Therefore, the state transitions to RRA 330, if there is sufficient LLC access bandwidth when compared to the limited requests. Then all round robin scheduled accesses are granted 335 and transitioned to grant LLC access state 340.

If the arbitration logic detects that the outstanding LLC access requests may cause LLC access congestion 315, the finite state machine transitions to PRA state 320. Then all scheduled accesses may be granted 345 on priority round robin arbitration and transitioned to grant LLC access state 340.

In the PRA state 320, the external snoop request may have the highest priority; next, the self snoop request may have priority; then, the core access request without multiple outstanding LLC misses may have priority; and finally, core access request may be granted to avoid starvation and others at the lowest priority.

The arbitration logic may cross check the LLC access address. It may go through the two portions of the CAMing comparison to reduce the large CAM circuit delay. It may also separate comparing tag portion and index portion. If one of them does not match, the LLC request may not be merged as the redundant LLC access. If both of them match and the second access is a read only transaction, the second LLC access may be merged as a redundant LLC access.

Since there are multiple requests to LLC, the LLC access arbitration logic needs to ensure fairness by making sure that any request source has a minimal progress during a given time period. This situation does not arise if only round-robin arbitration is used. For the priority based round-robin mechanism, it is necessary to have this requirement to avoid starvation. The basic mechanism is to ensure each requester at least has one LLC access during a given time period.

Advantageously, the embodiments described above present an mechanism to improve the LLC access schedule. This mechanism may enhance server processor performance and scalability for uncore with very large LLCs as well as multiple cores on a die processors.

In another embodiment, mechanism for implementing a cache coherent multi-core CMP system is proposed. Cache coherency needs to be maintained in CMP systems that conform to memory ordering requirements. The cache coherency becomes even more complicated when the system has a caching front side bridge (CFB) connected to two or more cores and with a large shared inclusive cache.

Figure 4:
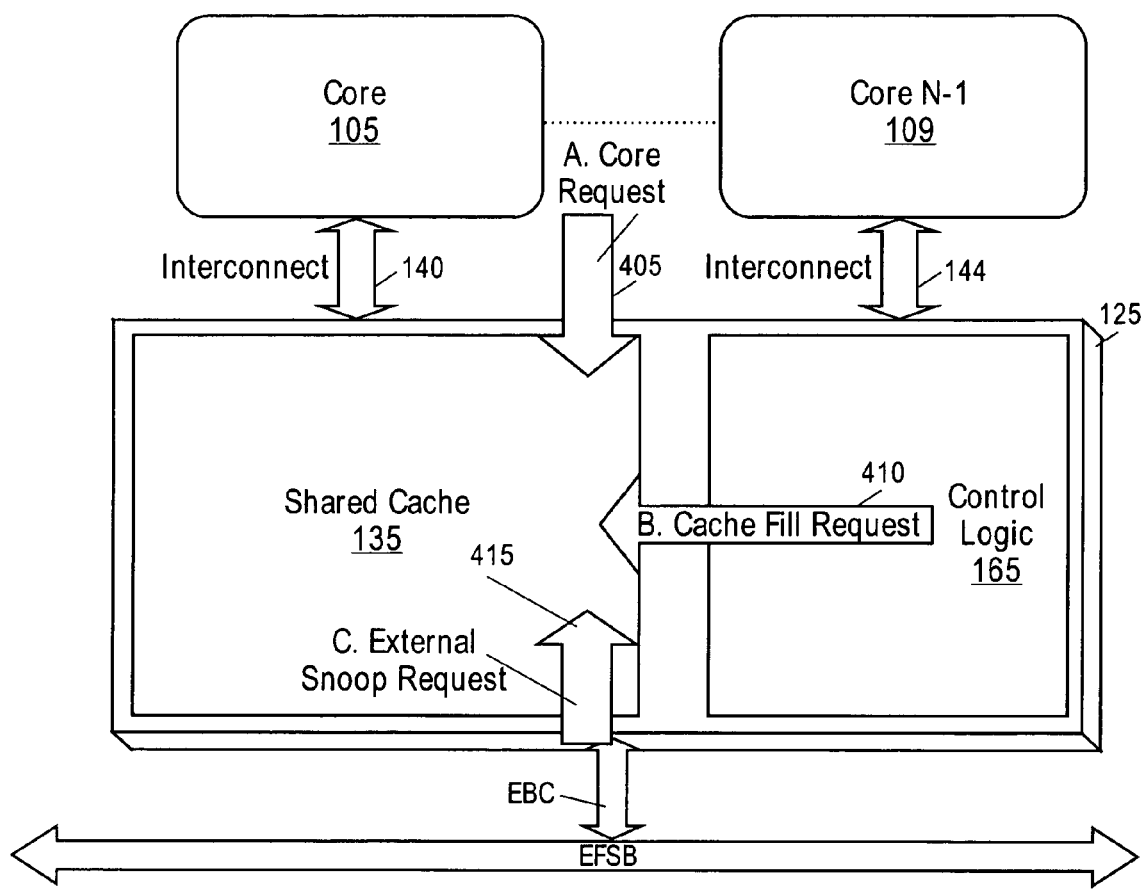
FIG. 4 is a block diagram of a shared cache access time window according to one embodiment.

FIG. 4 illustrates a shared cache access time window. In this time window, the caching bridge 125 act as a bridge between external systems, the LLC, and the cores in the processor. The cores 105, 109 are connected to the bridge 125 through the interconnect interfaces 140, 144 on the bridge 125. The bridge 125 is responsible for maintaining the coherency of the cache lines present in the LLC.

The embodiment of FIG. 4 provides a solution to maintain cache coherency in the system. There are mainly three time windows where a transaction would access the LLC cache. These three time windows are a cache lookup 405, a cache fill 410 and an external/self snoop 415.

All actions needed in the three time window mentioned above are controlled by the CFB control logic 165 and a LLC cache control logic. Each transaction that goes into the CFB 125 will have at least one or two of the actions mentioned above during its life in the CFB 125. Which action is chosen is depended on the type of requests from the core, the current LLC state, and the LLC core bits.

Referring now to the three time windows discussed above. A cache lookup 405 occurs when the core(s) issue read or read for ownership transactions to the CFB 125 and needs to lookup the LLC cache in the CFB 125.

There are various possible actions based off of the lookup results of the LLC cache. First, if the LLC cache is hit with proper cache states and corebits, then the mechanism may return immediately to the issuing core with the snoop response and data. Second, if it is not necessary to snoop other agents in the system, the logic may simply snoop the other core(s) in the system, thus reducing the overhead of going to the system bus. Third, if the transaction requires snooping other agents and also requires snooping the issuing core (either core requested for buried hitm or other reasons). Finally, if snooping other agents in the system is required and selfsnooping is NOT required.

A cache fill 410 occurs when a write back from the core or a data fetch from the memory sub-system arrives in the CFB 125 and a fill is needed to the CFB LLC cache.

A snoop request from other agents in the system or from your own package needing to lookup the LLC cache for a snoop response 415 occurs when a hit in the snoop request may need to snoop the core(s) in the package to maintain proper coherency of the system. The possible actions in this case are: first if the cache state and core bits from the LLC cache indicate no core snoops are needed, the system may immediately respond with the snoop results and data back to the system bus. Secondly, if snoops to the core(s) are needed, CFB 125 may wait until snoops to the core(s) are finished to respond to the system bus.

Figure 5:
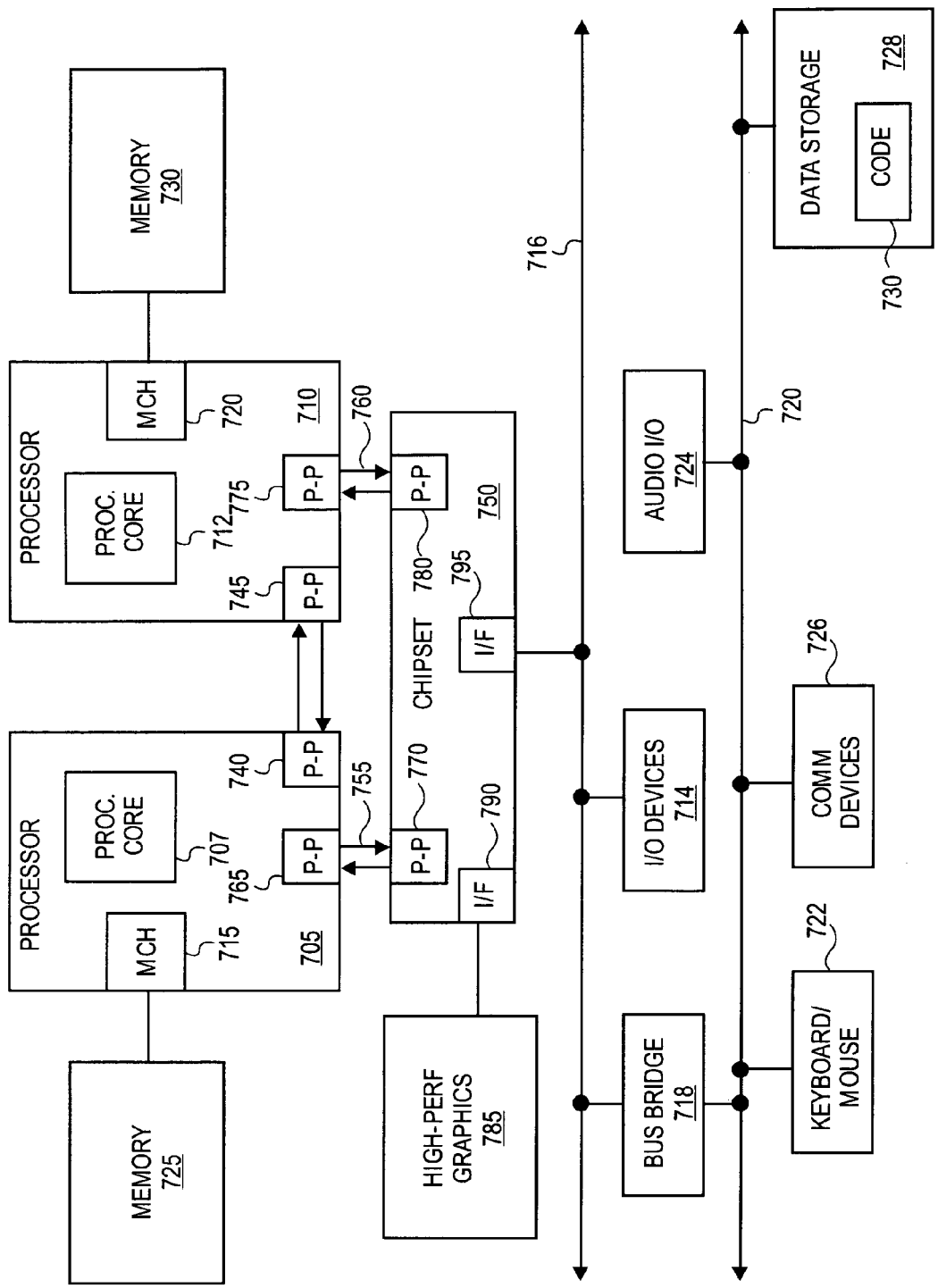
FIG. 5 is a block diagram of an alternative system that may provide an environment for cache coherency sequencing and adaptive LLC access priority control.

Referring now to FIG. 5, the system 700 includes processors supporting a lazy save and restore of registers. The system 700 generally shows a system where processors, memory, and input/output devices are interconnected by a number of point-to-point interfaces. The system 700 may also include several processors, of which only two, processors 705, 710 are shown for clarity. Each processor 705, 710 may each include a processor core 707, 712, respectively. Processors 705, 710 may each include a local memory controller hub (MCH) 715, 720 to connect with memory 725, 730. Processors 705, 710 may exchange data via a point-to-point interface 735 using point-to-point interface circuits 740, 745. Processors 705, 710 may each exchange data with a chipset 750 via individual point-to-point interfaces 755, 760 using point to point interface circuits 765, 770, 775, 780. Chipset 750 may also exchange data with a high-performance graphics circuit 785 via a high-performance graphics interface 790.

The chipset 750 may exchange data with a bus 716 via a bus interface 795. In either system, there may be various input/output I/O devices 714 on the bus 716, including in some embodiments low performance graphics controllers, video controllers, and networking controllers. Another bus bridge 718 may in some embodiments be used to permit data exchanges between bus 716 and bus 720. Bus 720 may in some embodiments be a small computer system interface (SCSI) bus, an integrated drive electronics (IDE) bus, or a universal serial bus (USB) bus. Additional I/O devices may be connected with bus 720. These may include keyboard and cursor control devices 722, including mouse, audio I/O 724, communications devices 726, including modems and network interfaces, and data storage devices 728. Software code 730 may be stored on data storage device 728. In some embodiments, data storage device 728 may be a fixed magnetic disk, a floppy disk drive, an optical disk drive, a magneto-optical disk drive, a magnetic tape, or non-volatile memory including flash memory.

Throughout the specification, the term, "instruction" is used generally to refer to instructions, macro-instructions, instruction bundles or any of a number of other mechanisms used to encode processor operations.

What is claimed is:

1. A processor comprising:
    a last level cache (LLC);
    a set of LLC request queues to hold a number of outstanding entries of a plurality of access requests prior to scheduling of their access to the LLC;
    control logic to determine a utilization of the LLC at least in part from the number of outstanding entries in the set of LLC request queues; and
    a scheduler coupled to the LLC, the scheduler to select which outstanding entries to schedule, from the plurality of access requests in the LLC request queues, to the LLC in a round robin fashion without a priority mechanism in response to determining the LLC has a utilization below a threshold utilization, and
    the scheduler to grant a higher priority scheduling to an access request of the plurality of access requests than in an equal round robin scheduling of the plurality of access requests, said higher priority scheduling based on a request type of the access request, and said granting in response to determining the LLC has a utilization above the threshold utilization.

2. The processor of claim 1, wherein the processor includes a plurality of cores to share the LLC, each of the plurality of cores including a cache capable of holding shared data, and wherein each of the plurality of caches are also capable of implementing a portion of a directory-based coherency scheme.

3. The processor of claim 1 wherein in response to determining the LLC has a utilization above the threshold utilization, the scheduler is to prioritize the plurality of access requests based on a priority hierarchy of request type from highest priority to lowest priority as follows: an external snoop request type, a self snoop request type, a core access request without multiple outstanding LLC misses type, and an other core access request type.

4. The processor of claim 3 wherein core and snoop-accesses to the same address occur simultaneously.

5. The processor of claim 1, wherein determining the LLC has a utilization below a threshold utilization comprises determining a runtime average LLC bandwidth and latency is less than a threshold bandwidth and latency, and wherein determining the LLC has a utilization above the threshold utilization comprises determining the runtime average LLC bandwidth and latency is greater than or equal to a threshold bandwidth and latency.

6. The processor of claim 3, wherein the scheduler is to schedule a second plurality of accesses to the LLC based on a priority selection mechanism further comprises the priority selection mechanism employing an anti-starvation mechanism check to ensure that each of the second plurality of access requests have a specified amount of progress within a time period.

7. The processor of claim 3, wherein the scheduler is to schedule a second plurality of accesses to the LLC based on a priority selection mechanism further comprises the priority selection mechanism employing a merge redundant access request mechanism, wherein a snoop and core access request of the second plurality of access requests accessing the same address are to be merged.

8. A method comprising:
    determining a queue occupancy of a plurality of outstanding last level cache (LLC) access requests queued for scheduling of their accesses to a LLC of a microprocessor;
    determining a bandwidth and latency utilization of the LLC at least in part from the queue occupancy;
    prioritizing an outstanding LLC access request from a first queue of the plurality of outstanding LLC access requests based on an access request type of the first queue of outstanding LLC access requests and scheduling the outstanding LLC access request based on the prioritizing in response to the bandwidth and latency utilization of the LLC being greater than a threshold bandwidth and latency utilization of the LLC; and
    scheduling the plurality of outstanding LLC access requests utilizing round robin arbitration without prioritizing in response to the bandwidth and latency utilization of the LLC being less than the threshold bandwidth and latency utilization.

9. The method of claim 8, wherein arbitration logic is to determine the plurality of outstanding LLC access requests, and wherein the arbitration logic is to be idle in response to determining no outstanding requests are available.

10. The method of claim 8, further comprising scheduling the plurality of outstanding LLC access requests utilizing a priority round robin arbitration based on the plurality of outstanding LLC access requests based on an access request type of each of the plurality of outstanding LLC access requests in response to the bandwidth and latency utilization of the LLC being greater than the threshold bandwidth and latency.

11. The method of claim 10, wherein the LLC is included in a microprocessor and is shared by a plurality of cores within the microprocessor.

12. The method of claim 11, the priority round robin arbitration grants highest priority to external snoop requests.

13. The method of claim 10, further comprising ensuring each of a plurality of requestors associated with the plurality of outstanding LLC access requests having at least one LLC access during a given time period.

14. A processor comprising:
    a bridge coupled to a plurality of cores on the same package, wherein the bridge includes a shared cache and control logic to determine a utilization of the shared cache, the control logic to schedule a plurality of outstanding shared cache access requests queued, in a plurality of request queues, for scheduling, from their respective request queues, utilizing a priority mechanism in response to the utilization of the shared cache being above a threshold, and
    the control logic to schedule the plurality of outstanding shared cache access requests, from their respective request queues, utilizing a round robin mechanism without priority in response to the utilization of the shared cache being below the threshold.

15. The processor of claim 14 wherein the shared cache is a last level cache (LLC), and wherein the bridge acts as a conduit for an input/output unit to communicate with an external system, the LLC, and the plurality of cores.

16. The processor of claim 15, wherein the bridge maintains coherency of a cache line present in the LLC.

17. The processor of claim 14, comprising:
a set of request queues to hold the plurality of outstanding shared cache access requests for scheduling;
said control logic to determine the utilization of the shared cache at least in part from a count of the plurality of outstanding shared cache access requests queued for scheduling.

18. The processor of claim 17, wherein said control logic is to determine the utilization of the shared cache at least in part from an average, over the set of request queues, of the count of the plurality of outstanding shared cache access requests queued for scheduling.

19. The method of claim 8, wherein determining the bandwidth and latency utilization of the LLC is at least in part from an average queue occupancy over a set of request queues storing the plurality of outstanding LLC access requests for scheduling.

20. The processor of claim 1, wherein said control logic is to determine the utilization of the LLC at least in part from an average of the number of outstanding entries over the set of LLC request queues.

* * * * *